(12) United States Patent
Jagodzinski (10) Patent No.: US 12,101,011 B2
(45) Date of Patent: Sep. 24, 2024

(54) ELECTROMAGNETIC ACTUATOR

(71) Applicant: Nui Lab GmbH, Schorndorf (DE)

(72) Inventor: Ron Jagodzinski, Schwabisch Gmund (DE)

(73) Assignee: Nui Lab GmbH, Schorndorf (DE)

( * ) Notice: Subject to any disclaimer, the term of this patent is extended or adjusted under 35 U.S.C. 154(b) by 249 days.

(21) Appl. No.: 17/760,952

(22) PCT Filed: Sep. 10, 2020

(86) PCT No.: PCT/EP2020/075366
§ 371 (c)(1),
(2) Date: Mar. 16, 2022

(87) PCT Pub. No.: WO2021/052862
PCT Pub. Date: Mar. 25, 2021

(65) Prior Publication Data
US 2022/0352803 A1 Nov. 3, 2022

(30) Foreign Application Priority Data

Sep. 17, 2019 (DE) .................... 20 2019 105 129.9

(51) Int. Cl.
*H02K 33/18* (2006.01)
*H02K 33/16* (2006.01)

(52) U.S. Cl.
CPC ............. *H02K 33/18* (2013.01); *H02K 33/16* (2013.01)

(58) Field of Classification Search
CPC ................................. H02K 3/18; H02K 3/16
See application file for complete search history.

(56) References Cited

U.S. PATENT DOCUMENTS

| 5,434,549 | A | 7/1995 | Hirabayashi et al. | |
| 7,550,880 | B1 | 6/2009 | Pusl | |
| 7,768,160 | B1 | 8/2010 | Sahyoun | |
| 2005/0200207 | A1* | 9/2005 | Hasegawa | H02K 33/16 310/10 |
| 2006/0255665 | A1* | 11/2006 | Kraus | H02K 33/18 310/36 |
| 2009/0134721 | A1 | 5/2009 | Zimmerling | |
| 2019/0206601 | A1 | 7/2019 | Wauke | |
| 2020/0274432 | A1 | 8/2020 | Wauke | |

FOREIGN PATENT DOCUMENTS

| EP | 0580117 A2 | 1/1994 |
| WO | 2010021482 A2 | 2/2010 |
| WO | 2010021482 A3 | 2/2010 |
| WO | 2019098249 A1 | 5/2019 |

* cited by examiner

Primary Examiner — Jue Zhang
(74) Attorney, Agent, or Firm — The Webb Law Firm (57) ABSTRACT

An electromagnetic actuator including a first object comprising at least one magnet; and a second object comprising at least one magnet. The first object and the second object are movable relative to each other. The first object is an oscillator and the second object is a stator, or the first object is a stator and the second object is an oscillator. The first object is essentially arranged inside the second object. The actuator comprises at least one first actuator side where magnets of the first object and the second object are arranged opposite each other and act upon each other. On the at least one actuator side an uneven number of poles of the one object are arranged opposite an even number of poles of the other object.

19 Claims, 10 Drawing Sheets

ELECTROMAGNETIC ACTUATOR

CROSS-REFERENCE TO RELATED APPLICATIONS

This application is the United States national phase of International Application No. PCT/EP2020/075366 filed Sep. 10, 2020, and claims priority to German Patent Application No. 20 2019 105 129.9 filed Sep. 17, 2019, the disclosures of which are hereby incorporated by reference in their entirety.

BACKGROUND

Field of the Invention

The disclosure relates to an electromagnetic actuator, in particular an electromagnetic vibration actuator.

Description of Related Art

Actuators are used for converting electric signals into mechanical movements. A preferential field of application of these actuators is the generation of haptic and/or acoustic feedback via oscillations or vibrations, for example. Electronic devices, such as cell phones, tablets, touchpads, smartwatches, games consoles and touch elements for switches and the like, for example, use actuators for providing to the user a perceptible and/or audible feedback via information input and information output.

On the one hand, cell phones use vibrations for information output, for example for soundlessly informing the user of an incoming call. In a noise-sensitive environment, such as meetings, for example, information can thus be provided to the user without disturbing others. In a noise-intensive environment, such as concerts, for example, where acoustic signals cannot be noticed, information can also be provided to the user in this manner.

On the other hand, vibrations are used in modern cell phones with a touch display, for example, for providing to the user a feedback to her/his input.

For generating a feedback, a plurality of different actuators are used. Frequently, electric motors having an eccentric mass, also referred to as an unbalance motor, are used. Here, the electric motor experiences an unbalance which transfers a vibration to the surface fastened to the electric motor. Actuators comprising an electric motor require a comparably large space. Due to the configuration, these unbalance motors require a relatively large amount of power, which results in a shorter battery life in portable devices. Furthermore, electric motors have a comparably long reaction time.

The frequency and the amplitude of the feedback, such as the vibration, for example, of an unbalance motor are inevitably coupled with each other. Thus, rapid and strong or slow and weak vibrations can be generated, for example. However, it is not possible to generate rapid and weak or strong and slow vibrations. Complex oscillations of the feedback, such as the vibration, for example, cannot be generated with the aid of unbalance motors, but merely sinusoidal oscillations. Thus, it is not possible that unbalance motors help generate oscillations which correspond to a complex waveform of sound waves, for example.

Furthermore, linear actuators and rotating actuators are known. Such actuators generally comprise a coil stator having a permanent magnet oscillator arranged inside the coil stator. Here, the permanent magnet linearly or rotatingly oscillates, in particular reciprocates, due to the excitation of the at least one coil of the stator, which normally results in an unbalance. Thereby, a vibration can be generated, for example. However, such actuators have drawbacks. For example, it is disadvantageous that the permanent magnet must have a sufficient size, in particular relative to the at least one coil, for providing a sufficient magnetic force for generating the desired unbalance for vibrations. This leads to a miniaturization problem.

Another drawback of known actuators, in particular linear actuators and rotating actuators, is that they are affected by magnetic objects in their vicinity, in particular ferromagnetic, such as iron-containing objects, for example. On the one hand, the actuator performance may thus be affected. On the other hand, actuators are frequently attracted by such objects and/or adhere to them.

SUMMARY

It is an object of the disclosure to provide an electromagnetic actuator whose applicability for vibration output is improved.

The electromagnetic actuator is in particular a vibration actuator. Hence, it is preferred that the actuator is configured such that it generates a mechanical movement serving for outputting a perceptible signal or feedback. The actuator comprises a first object. This first object comprises at least one magnet. Further, the actuator comprises a second object. The second object comprises at least one magnet. It is particularly preferred that the actuator is composed of the first and the second object. The first object and the second object are configured such that they are movable relative to each other. On the one hand, the first object is an oscillator and the second object is a stator. On the other hand, it is possible that the first object is a stator and the second object is an oscillator. Here, the oscillator is in particular defined such that it oscillates with respect to the environment and/or with respect to a receiving object, such as a smartphone, for example. On the other hand, it is preferred that the stator is stationary with respect to such a receiving object and/or transfers a feedback to the same. The first object is essentially arranged inside the second object. Here, inside in particular means that the first object is enclosed or embraced by the second object. Here, enclosed means that the first object is in particular completely arranged inside the outer contour of the second object. Such enclosing can either be realized such that the first object is completely surrounded or at least partially exposed. If the second object is configured as a hollow cuboid, for example, the first object is by definition in particular completely "enclosed" inside the outer contour of the second object. Here, on the one hand, it is possible that the outer walls of the hollow cuboid completely cover the first object. On the other hand, it is possible that portions of the outer walls of the hollow cuboid are omitted and/or holes are provided, for example, and thus at least portions of the first object are exposed and are in particular freely visible. Embracing however means that the first object is at least essentially embraced by the second object preferably in at least one plane. For example, the second object can be configured as a hollow ring, an oval, a rectangle or a polygon, and this configuration can thus be arranged around the first object. For example, it is possible that this configuration is not continuous. In the case of a ring-shaped configuration, it is possible that the ring is composed of a plurality of graduated-circle segments and/or is discontinuous. The actuator has at least one actuator side. On the at least one actuator side the first object and the second object magnetically act upon each other. Hence, the at least one actuator side preferably is an active actuator side. It is particularly preferred that one or a plurality of magnets of the first object and one or a plurality of magnets of the second object act upon each other, wherein the magnets acting upon each other are preferably disposed opposite each other. The at least one actuator side is in particular a magnetic active side. It is particularly preferred that the actuator as a whole has a first actuator side and a second actuator side. On the at least one actuator side, particularly preferably on each actuator side, an uneven number of poles of the one object are disposed opposite an even number of poles of the other object, said poles in particular acting upon each other. For example, if the first object has three poles, e.g. south pole, north pole, south pole, on a first actuator side, these three poles in particular act upon two oppositely arranged poles, e.g. south pole, north pole. Acting upon in particular means an interaction of the poles and/or magnets, preferably attraction and/or repelling.

According to a preferred embodiment, the first object or the second object has a preferably continuous reversal of at least one polarity for causing the objects to move relative to each other. Here, it is preferred that the polarity of at least one magnet of the first object or the polarity of at least one magnet of the second object is reversed. Thus, at this at least one magnet the north pole and the south pole switch their positions. It is particularly preferred that the polarity of all magnets of the first object or the polarity of all magnets of the second object is reversed.

It is preferred that the magnetization direction of the magnets of the first object is essentially perpendicular to the magnetization direction of the magnets of the second object. Here magnetization direction in particular means a connecting line between north pole and south pole of a magnet. Particularly preferably, the magnetization direction is a directed connecting line, for example an arrow, extending from the north pole to the south pole. If according to a preferred embodiment, the second object comprises axial magnets and the first object comprises coils, for example, it is preferred that the axial axes of the axial magnets are perpendicular to the axial axes of the coils.

According to a preferred embodiment, the first object and/or the second object are structurally and/or magnetically symmetrical, in particular with respect to one or two or three symmetry planes. It is preferred that the magnets of the first object and/or the magnets of the second object are structurally and/or magnetically symmetrical, preferably with respect to one or two or three symmetry planes. According to a particularly preferred embodiment, the first object and the second object are structurally symmetrical with respect to three symmetry planes but are magnetically symmetrical merely with respect to two symmetry planes. Here, magnetically symmetrical means that the magnetization direction, in particular the arrangement of the poles, is not symmetrical with respect to a symmetry plane, i.e. cannot be mirrored at this symmetry plane for mapping the opposite side. In particular, the first object and/or the second object and/or the entire actuator are structurally rotationally symmetrical about at least one of the x, y, and z axes and/or magnetically rotationally symmetrical about the x or the z axis.

According to a preferred embodiment, the magnets of the one object are electromagnets, preferably coils. Here, the magnets of the other objects preferably are configured as permanent magnets. In the case of a configuration as permanent magnets, it is preferred that they are in particular cylindrical or cuboid bar magnets. It is preferred that the magnetization of the permanent magnets is an axial magnetization—thus they are axial magnets. If the one or the other object merely comprises one magnet, it is preferred that merely this one magnet is configured in accordance with the aforementioned definition. According to a particularly preferred embodiment, the at least one magnet of the first object is an electromagnet, in particular a coil, and the at least one magnet of the second object is a permanent magnet. In particular due to the aforementioned particularly preferred embodiment with regard to the magnets and the thus realized internal arrangement of the electromagnets, the actuator does advantageously not adhere to a magnetic, in particular ferromagnetic environment. According to an alternative embodiment, it is also possible that the at least one magnet of the first object and the at least one magnet of the second object are configured as electromagnets, in particular as coils. Preferably, for a polarity reversal it is preferred to reverse the direction of the electric current applied to the coil. Thereby, in particular the movement of the objects relative to each other can be realized.

It is preferred that the first object comprises a plurality of magnets. These magnets of the first object are preferably arranged in parallel and or equidistantly to each other. Equidistant in particular means that the magnets have a same interspace between each other, that is a same distance between each other, and/or a same core distance, in particular coil core distance. Here, the definition of distance in particular means that adjacent magnets have the same distance to each other. If according to a preferred embodiment, the first object comprises three adjacent magnets, for example, the two exterior magnets in particular have the same distance to the middle magnet.

If according to a preferred embodiment, the first object comprises a plurality of magnets, adjacent magnets have in particular opposite magnetization directions. This definition of opposite magnetization directions is particularly preferably realized in the case of parallelly arranged magnets of the first object and/or parallelly magnetized magnets of the first object. For example, if according to a preferred exemplary embodiment, the first object comprises two parallel magnets, it is preferred that the magnetization directions of these magnets are opposite to each other, for example S-N and N-S. However, if according to another preferred exemplary embodiment, the first object comprises three parallel magnets, it is preferred that the middle magnet has a magnetization direction opposite to that of the two exterior magnets, and consequently, the two exterior magnets have an identical magnetization direction, for example S-N and N-S and S-N (or vice versa).

According to a preferred embodiment, the magnet length of the at least one magnet of the second object corresponds to the core distance, in particular the coil core distance of the magnets of the first object relative to each other. According to this embodiment, the first object comprises a plurality of magnets, in particular a plurality of coils, wherein the coils have an identical core distance to each other. In particular, this advantageously results in an optimum actuator intensity.

It is preferred that the second object comprises two oppositely arranged magnets, wherein the two magnets are arranged on both sides of the first object. Preferably, the two magnets of the first object hence embrace the first object. It is particularly preferred that the two magnets of the first object are arranged opposite each other on the front side with respect to the first object.

According to a preferred embodiment, the two magnets of the second object have an identical or an opposite magnetization direction. Preferably, an identical magnetization direction causes the first object to rotate, wherein an opposite magnetization direction leads to a linear deflection in particular of the second object relative to the first object.

It is preferred that the actuator is configured such that the first object moves perpendicularly to the magnetization direction(s) of the first object. Alternatively to the perpendicular movement, it is preferred that the first object rotates about its own axis. It is particularly preferred that the first object experiences an essentially parallel deflection relative to the magnetization direction(s) of the first object and/or the second object in the area of the at least one actuator side. This essentially parallel deflection in particular means that, in the case of a linear movement of the first object, the first object moves in parallel to the magnetization direction of the first and/or the second object in the area of the at least one actuator side, or in the case of a rotational movement of the first object in the area of the at least one actuator side, the tangent at the rotation is parallel to the magnetization direction(s) of the first object and/or the second object. In other words, it is preferred that the actuator is configured such that the first object moves perpendicularly to the magnetization direction(s) of the first object, or that the first object rotates about its own axis, wherein, in the area of the at least one actuator side, the first object in particular experiences an essentially parallel deflection relative to the magnetization direction(s) of the first object and/or the second object.

It is preferred that the actuator is configured such that an essentially parallel force action is present between the first object and the second object, in particular in the area of the at least one actuator side. Here, force action in particular means that the first object and the second object attract or repel each other in particular in the area of the at least one actuator side.

According to a preferred embodiment, the first object is rotationally and/or linearly supported relative to the second object.

It is preferred that the first object comprises a first accommodation body and/or the second object comprises a second accommodation body. Here, the first accommodation body and/or the second accommodation body respectively accommodate the at least one magnet of the respective object, in particular fix said magnet. If thus the first object comprises an accommodation body and the first object comprises a plurality of magnets, for example, preferably all magnets of the first object are accommodated by the accommodation body and in particular fixed relative to each other; the same applies to the second object or the second accommodation body, for example.

According to a preferred embodiment, the actuator comprises a damping device for damping the movement of the first object relative to the second object. In particular, the damping device is configured between the first and the second object, preferably on one side or on both sides. Here, on one side or on both sides in particular refers to movement sides of the oscillator. It is particularly preferred that the damping device comprises at least one damper. The damper is a spring, for example, preferably configured as a spring arm. Instead of or in combination with the spring, flexible and/or elastic damping elements can be used as dampers.

According to a preferred embodiment, the damping device is preferably unitarily, also referred to as integrally, connected to the first accommodation body and/or the second accommodation body. It is particularly preferred that the damping device as well as the first and/or the second accommodation body comprise a plastic material, in particular are made from the same. According to the embodiment where the damping device as well as the first and/or the second accommodation body are integrally formed, it is preferred that a kind of spring arm of the damping device is integrally provided between the first accommodation body and the second accommodation body.

According to a preferred embodiment, the first object comprises three magnets and the second object comprises two magnets. According to an alternative embodiment, the first object comprises one magnet and the second object comprises two magnets. According to another alternative preferred embodiment, the first object comprises five magnets and the second object comprises four magnets.

It is preferred that two oppositely arranged different magnetic poles of the second object are associated with at least one, preferably each magnet pole of the first object, wherein these two different magnetic poles of the second object act upon the magnetic pole of the first object, in particular, on the one hand, attract and, on the other hand, repel said magnetic pole. Alternatively to the above definition, it is preferred that two oppositely arranged different magnetic poles of the first object are associated with at least one, preferably each magnetic pole of the second object, wherein, again, these two different magnetic poles of the first object act upon the magnetic pole of the second object, in particular, on the one hand, attract and, on the other hand, repel said magnetic pole.

In the aforementioned definition with regard to the two different magnetic poles of the one object arranged opposite a magnetic pole of the other object, it is preferred that the one magnetic pole of the other object is arranged in the middle, in particular essentially centrally with respect to the two oppositely arranged magnetic poles. Here, in the middle in particular means an intermediate arrangement, wherein it is not necessary that the one magnetic pole is arranged in the middle of a connecting line of the other two magnetic poles. It is particularly preferred that in the middle or centrally means that the one magnetic pole is arranged equidistantly to the two oppositely arranged magnetic poles. It is particularly preferred that the one pole as well as the two oppositely arranged poles are disposed relative to each other such that they form an isosceles triangle, wherein the distance of the one pole to the two oppositely arranged poles represents the legs of said triangle. Alternatively to the definition as an isosceles triangle, it is possible that the definition corresponds to an equilateral triangle.

BRIEF DESCRIPTION OF THE DRAWINGS

Hereunder the disclosure will be explained in detail on the basis of a preferred embodiment with reference to the Figures in which.

DETAILED DESCRIPTION OF THE INVENTION

In the Figs., similar or identical components or elements are identified by the same reference numerals or variations thereof (14 and 14a or 24 and 24' etc., for example). In particular for clarity's sake, elements already identified are preferably not provided with reference numerals in all Figs.

Figure 1:
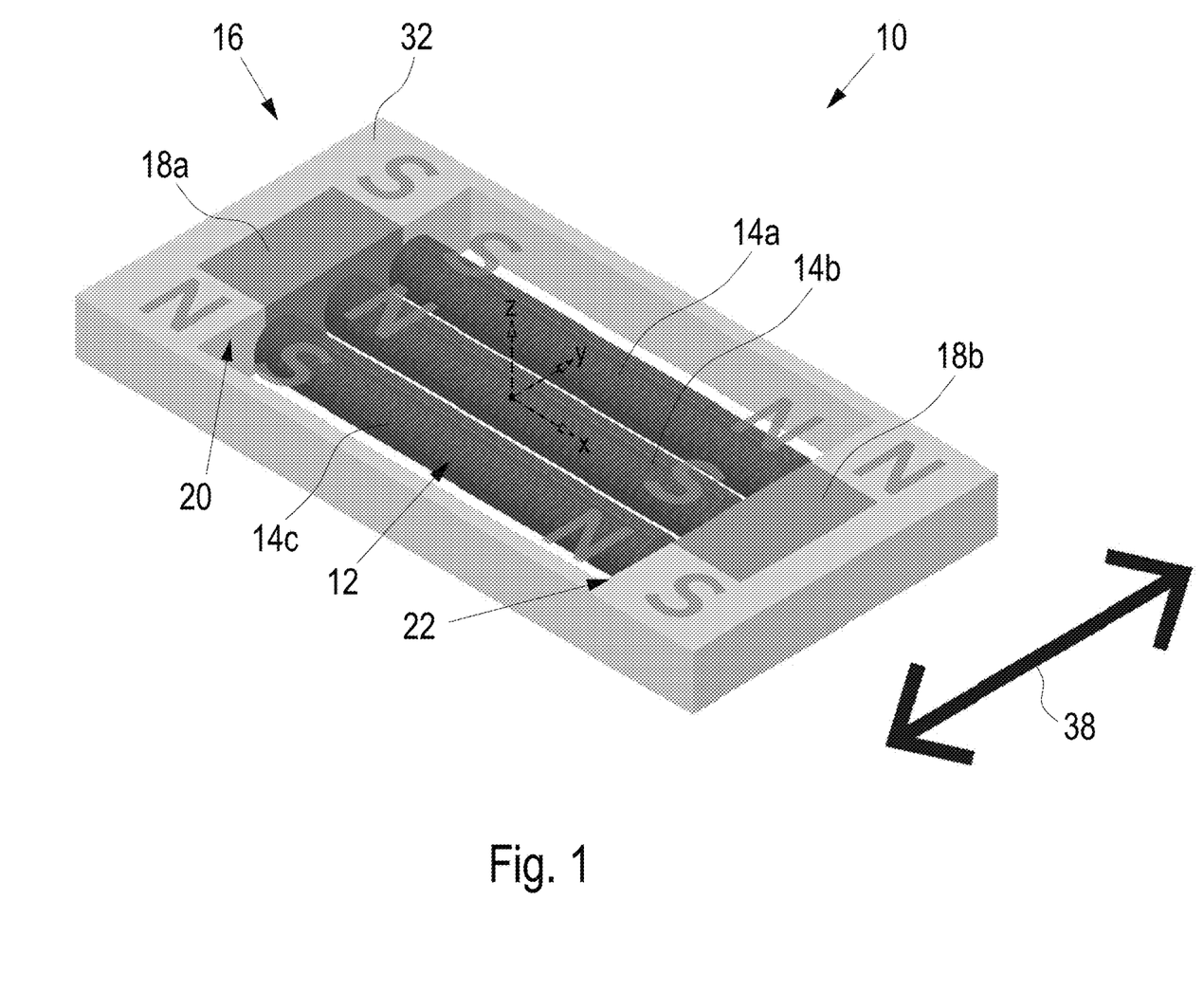
FIG. 1 shows a schematic perspective view of an embodiment of an electromagnetic actuator according to the disclosure.

FIG. 1 schematically shows an embodiment of an electromagnetic actuator 10 according to the disclosure. The electromagnetic actuator 10 comprises a first object 12 and a second object 16 which are movable relative to each other along a movement arrow 38. Preferably, the movement generates a feedback which can be transferred to the environment via the second object 16, for example.

The second object 16 comprises two oppositely arranged magnets 18a, 18b in particular configured as permanent magnets. The magnets 18a, 18b are accommodated by an accommodation body 32 and in particular fixed therein. It is particularly preferred that the accommodation body 32 can be connected to an object not illustrated where a feedback, such as a vibration, for example, can be output or forwarded. As illustrated, the two magnets 18a, 18b have parallel but opposite magnetization directions 24', 24" (see FIG. 2, for example).

Inside the second object 16 a first object 12 is movably arranged. As illustrated, the first object 12 comprises three magnets configured as coils 14a, 14b, 14c. The coils 14a, 14b, 14c are fixedly and thus immovably connected to each other (not illustrated) via an accommodation body, for example. The coils 14a, 14b, 14c arranged adjacent to each other respectively have an opposite magnetization direction. As illustrated, the middle coil 14b thus has a magnetization direction opposite to that of the coils 14a, 14c, wherein, hence, the coils 14a, 14c have an identical magnetization direction. However, the magnetization directions of the coils 14a, 14b, 14c are parallel to each other. Furthermore, the coils 14a, 14b, 14c are equidistant to each other.

On a first actuator side 20 the magnet 18a is arranged opposite the coils 14a, 14b, 14c and in particular acts upon them. On the opposite second actuator side 22 the magnet 18b and the coils 14a, 14b, 14c are correspondingly arranged opposite each other. In this (as well as in all other illustrated) embodiment(s), on each actuator side an uneven number of poles of the one object are arranged opposite an even number of poles of the other object. In this illustration, on each actuator side, actually three poles, i.e. an uneven number, of the first object 12 are arranged opposite two poles, i.e. an even number, of the second object 16. Due to the magnetization, in particular due to the pole arrangement on the respective actuator side 20, 22, in the illustrated embodiment, the first object 12 is linearly deflected relative to the second object 16 (see FIG. 3).

As illustrated, a coordinate system is plotted in the center of the actuator 10. This coordinate system can also be used for the other embodiments, in particular those of FIGS. 2 to 8. In particular in view of this coordinate system, the actuator and the first object 12 and the second object 16 are structurally symmetrical with respect to the XY, XZ and YZ plane. However, with regard to the magnetization, the actuator 10 and the first object 12 and the second object 16 are symmetrical with respect to the XY plane. The second object 16 and thus the entire actuator 10 are not symmetrical with respect to the XZ and YZ plane. Although the first object 12 is symmetrical with respect to the XZ plane, it is not symmetrical with respect to the YZ plane. Instead of non-symmetrical, an inverted symmetry is preferably alternatively meant here.

Figure 2:
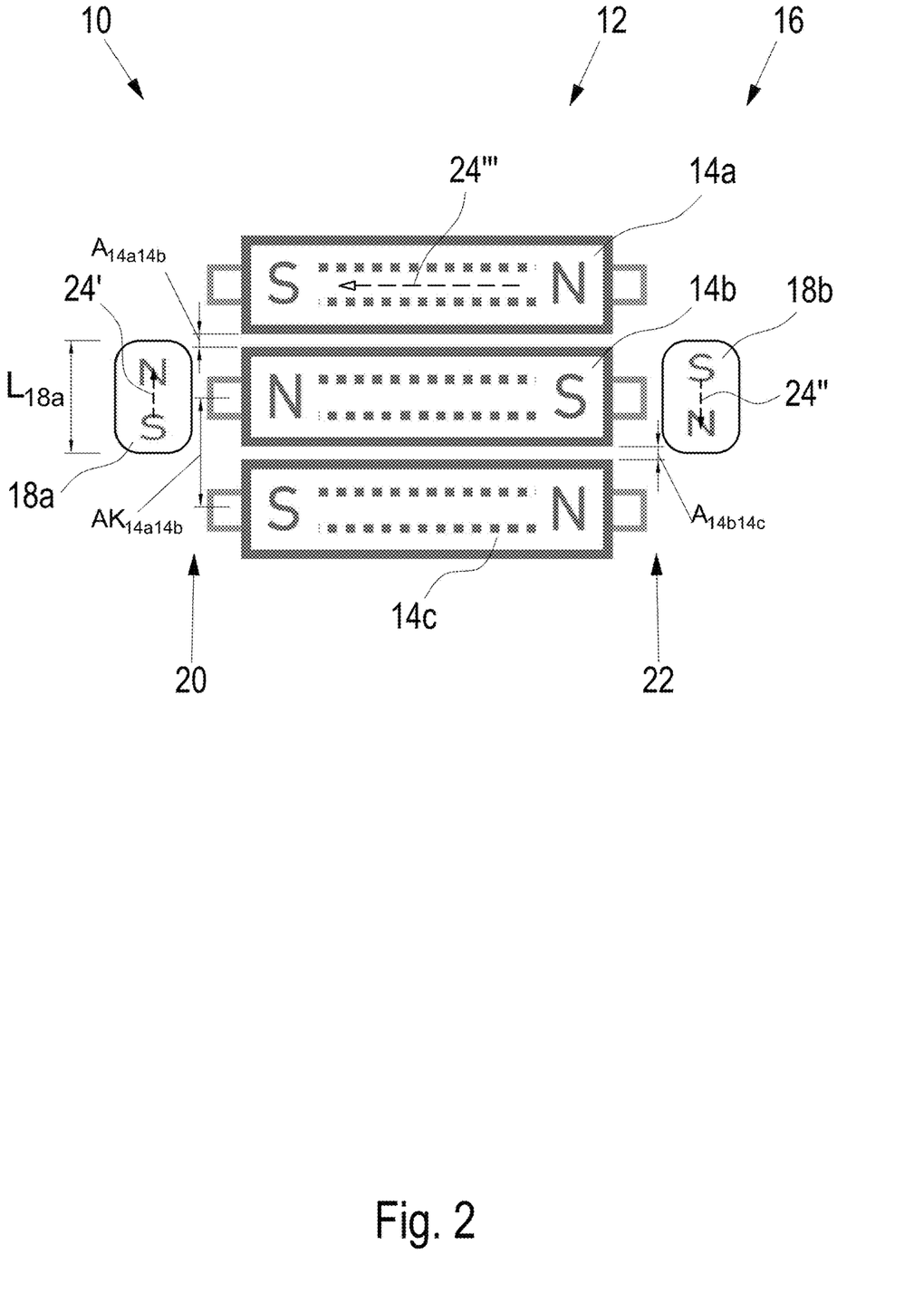
FIG. 2 shows a schematic view of another embodiment of an electromagnetic actuator according to the disclosure.

FIG. 2 shows another schematically illustrated embodiment of an electromagnetic actuator. Here, the embodiment is essentially based on the embodiment of FIG. 1. In contrast to the embodiment of FIG. 1, the embodiment of FIG. 2 does not comprise an accommodation body 32 or the latter is not illustrated.

The magnets 18a, 18b of the embodiment of FIG. 2 of the actuator 10 have a magnet length $L_{18a}$. Preferably, the magnet length of the magnet 18a is identical with that of the magnet 18b. It is particularly preferred that the magnet length $L_{18a}$ is identical with the coil core distance $AK_{14b, 14c}$ between the coil 14b and the coil 14c. It is particularly preferred that the coil core distance between the coil 14a and the coil 14b is identical with that of the coil 14b and the coil 14c. The distances $A_{14a, 14b}$ between the coil 14a and the coil 14b as well as $A_{14b, 14c}$ between the coil 14b and the coil 14c are also illustrated.

Figure 3:
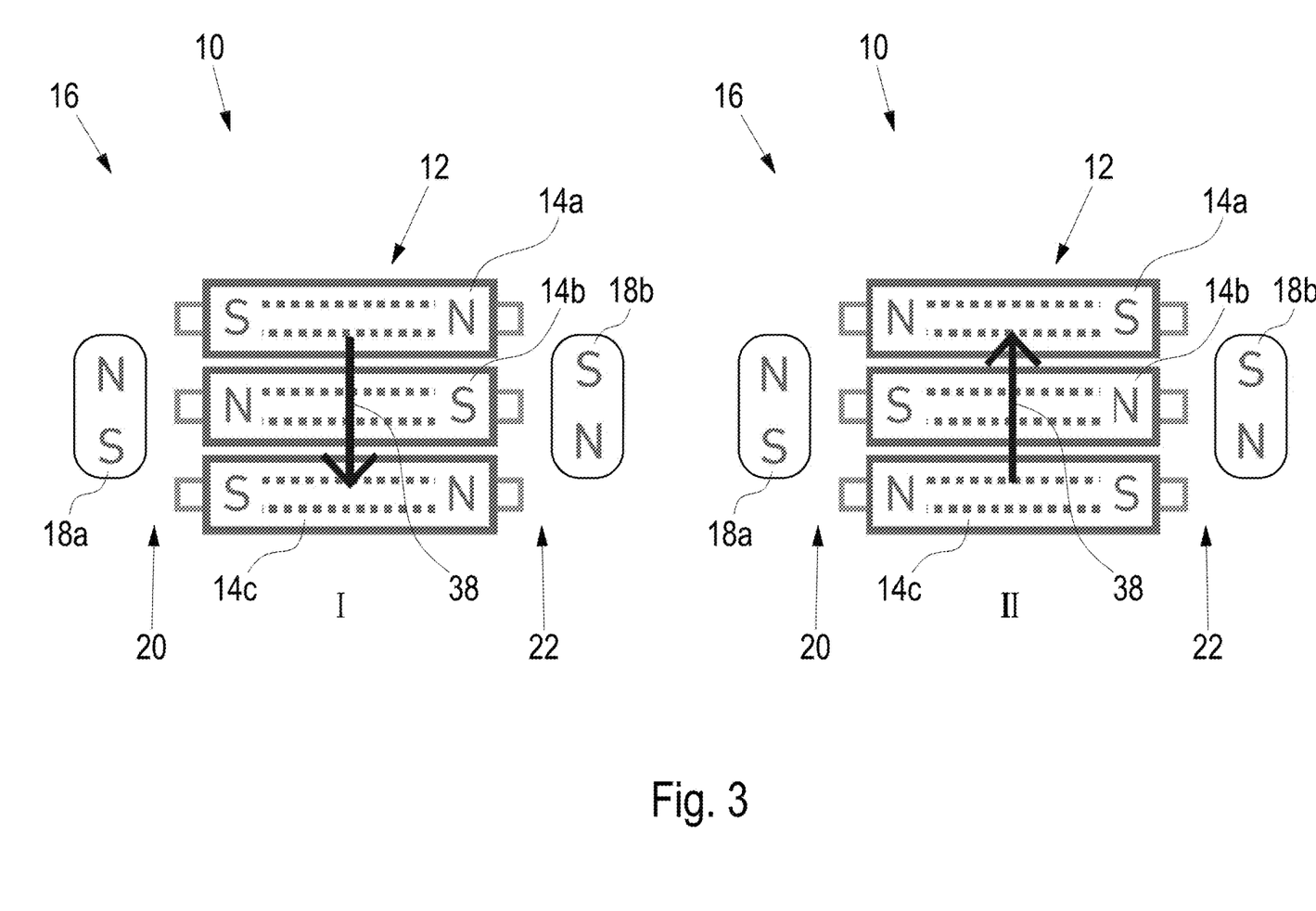
FIG. 3 shows schematic views of another embodiment of an electromagnetic actuator according to the disclosure in two states (I, II)

FIG. 3 shows two states of another embodiment of an actuator 10 according to the disclosure, wherein the embodiments are essentially based on the embodiments of FIGS. 1 and 2.

As compared to states I, II, the permanent magnets 18a, 18b (functionally) have an identical magnetization direction, wherein, however, the magnetization direction of the magnets 18a and 18b in each individual state are opposite to each other.

The coils 14a, 14b, 14c, however, have an opposite magnetization direction 24 in state I as compared to state II. It is particularly preferred that the different magnetization directions of the coils 14a, 14b, 14c are realized by a reversal of the direction of the electric current flowing through the coils 14a, 14b, 14c. Due to the action, in particular attraction and repelling, on the actuator sides 20, 22, in state I, a linear downward movement (see movement arrow 38) of the first object 12 relative to the second object 16 takes place. In the second state, however, an illustrated upward movement is correspondingly performed.

Figure 4:
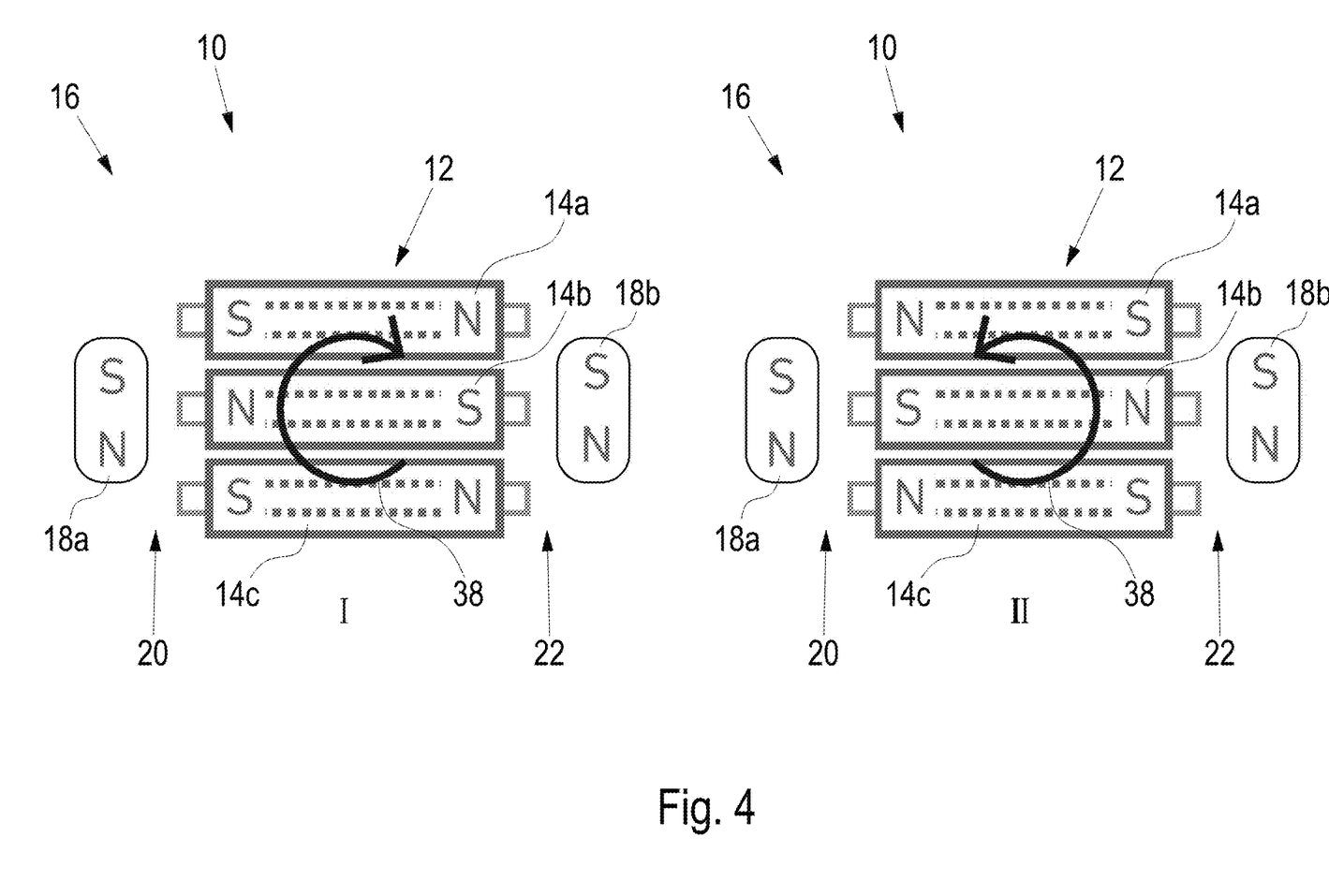
FIG. 4 shows schematic views of another embodiment of an electromagnetic actuator according to the disclosure in two states (I, II)

FIG. 4 schematically shows another embodiment of an actuator 10 according to the disclosure. The embodiment essentially corresponds to the embodiment of FIG. 3. In contrast to the embodiment of FIG. 3, the magnets 18a, 18b have an identical magnetization direction. Due to a thus different action on the actuator sides 20, 22, a rotational movement along the movement arrow 38 is hence performed, wherein, in states I and II, an opposite rotational movement takes place. In other words, between the movement states I, II the first object 12 reciprocates relative to the second object 16.

Figure 5:
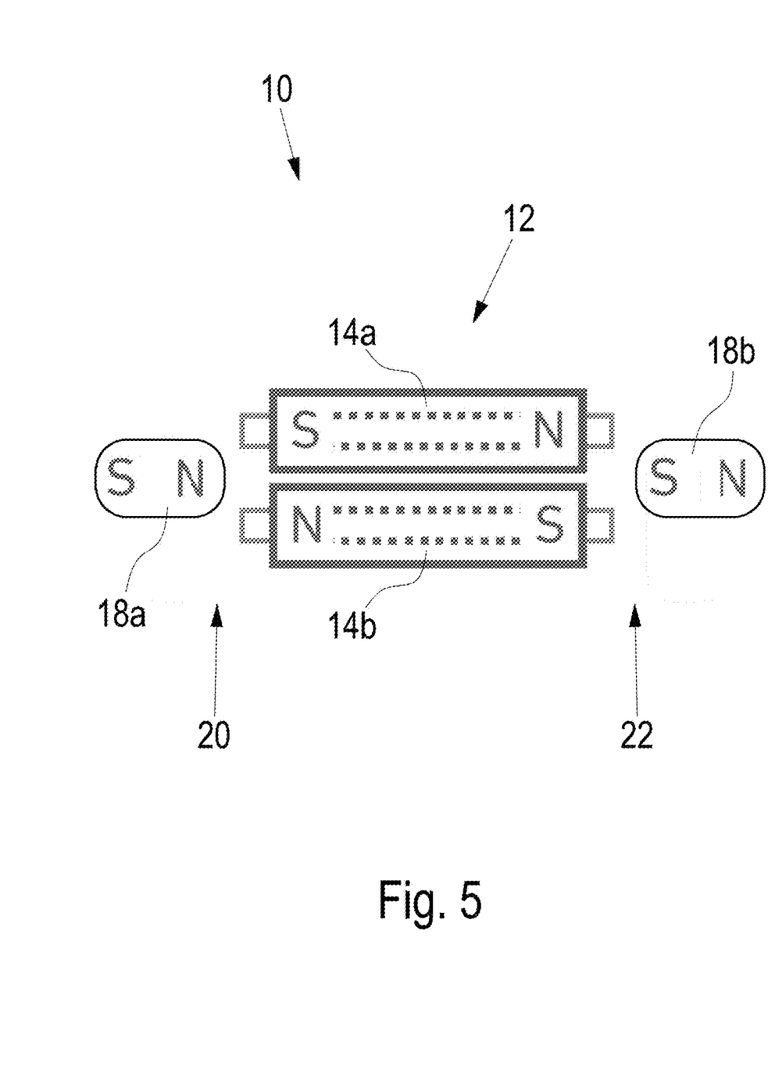
FIGS. 5-7 show schematic views of various further embodiments of an electromagnetic actuator according to the disclosure.
Figure 6:
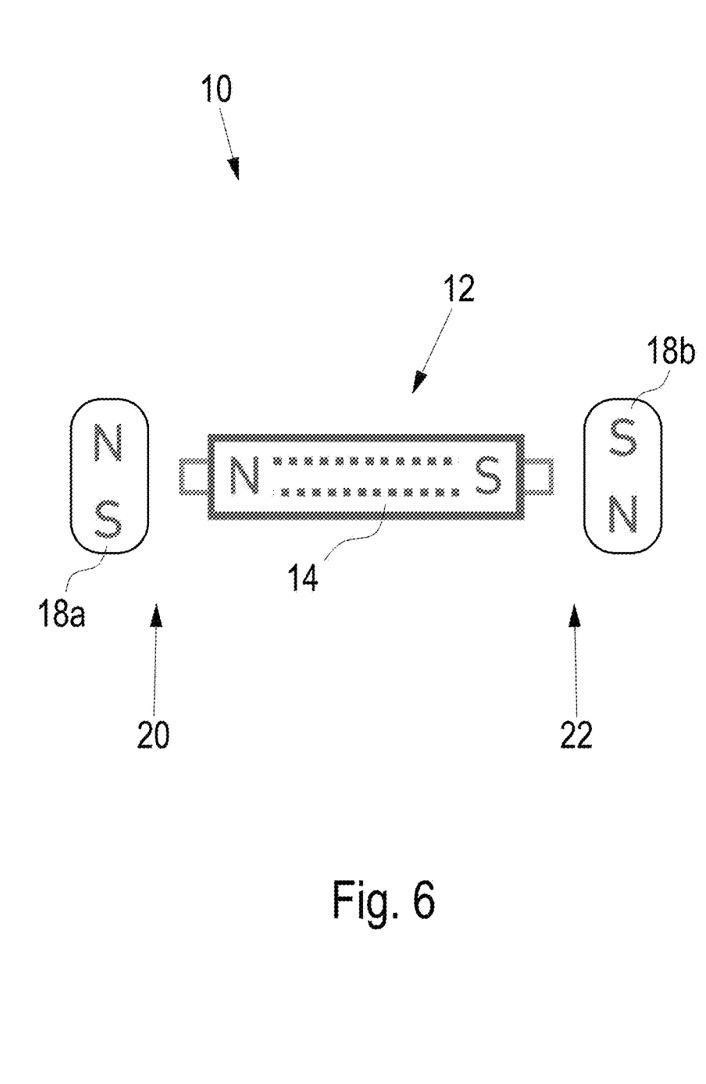
Figure 7:
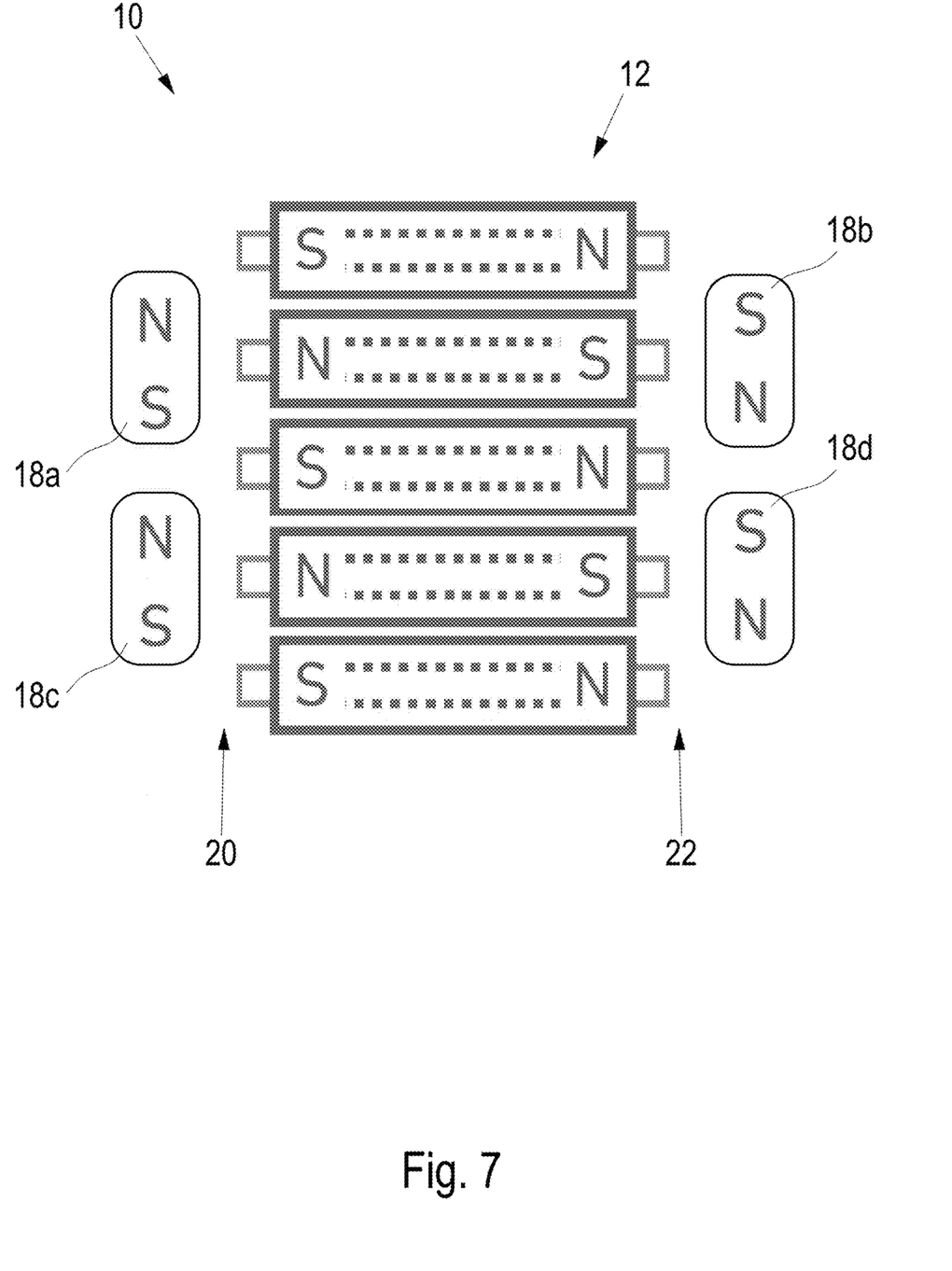

The various embodiments according to the disclosure schematically shown in FIGS. 5 to 7 are also based on the previous embodiments.

FIG. 5 merely shows two coils 14a, 14b of the first object 12. Furthermore, the magnets 18a, 18b of the second object 16 are turned by 90° (as compared to the previous embodiments). Due to this arrangement of the magnets 18a, 18b, still an uneven number of poles of the one object are arranged opposite an even number of poles of the other object on the actuator sides 20, 22 and in particular act upon each other. In the embodiment, two poles of the first object 12 are arranged opposite one pole of the second object 16 on each actuator side 20, 22. The exterior poles of the magnets 18a, 18b preferably do not show any effect, preferably no action on the respective actuator sides 20, 22.

In FIG. 6 an embodiment of an actuator 10 according to the disclosure is schematically illustrated, which merely comprises one coil 14 of the first object 12.

In FIG. 7 an embodiment of an actuator 10 according to the disclosure is schematically illustrated, wherein the first object comprises five coils and the second object comprises four coils. On the actuator sides 20, 22 these coils and magnets, in particular the respective poles, act upon each other.

The embodiments of the actuator 10 according to the disclosure of FIGS. 8a to 8d are essentially based on the embodiments of FIGS. 1 and 3.

Figure 8A:
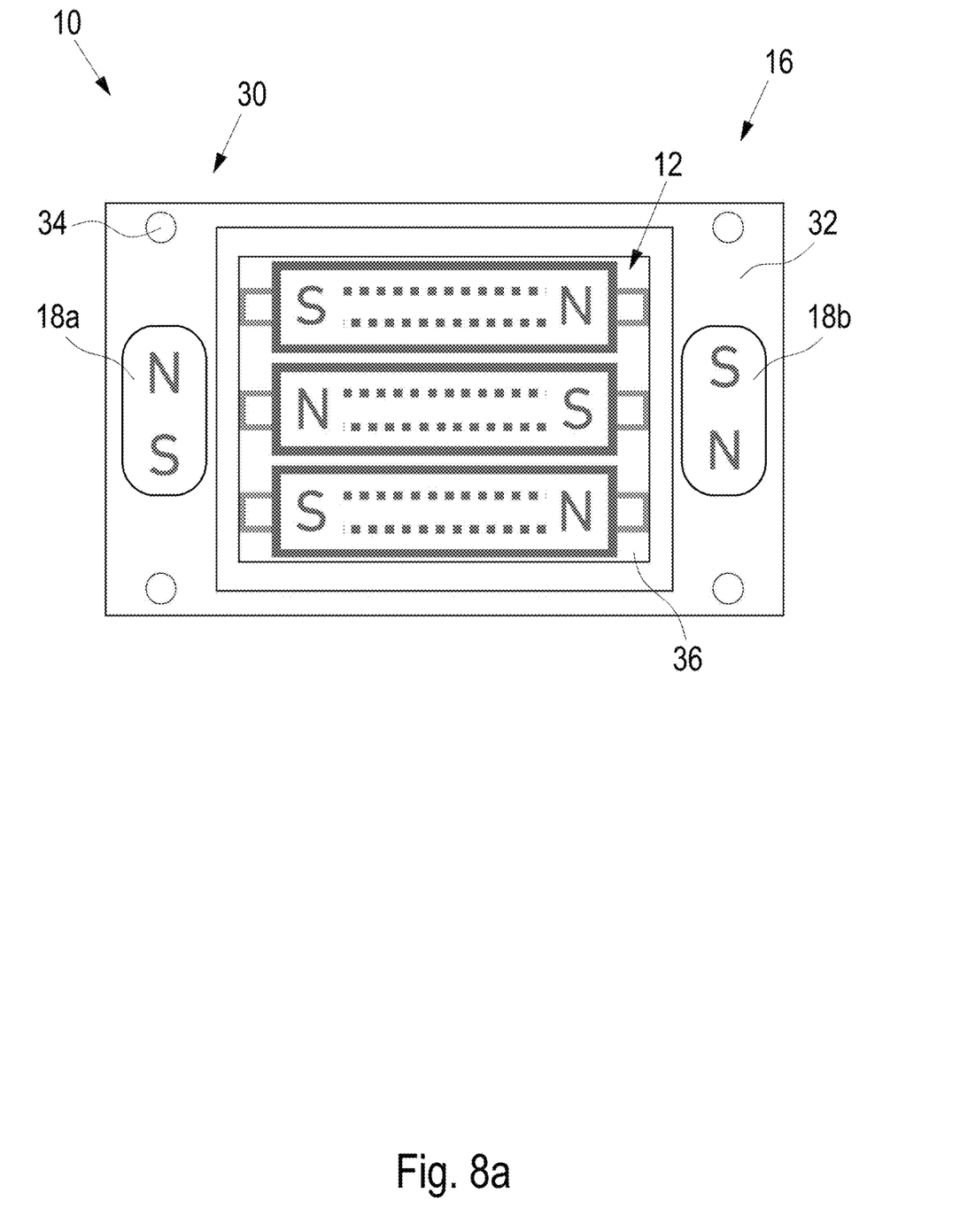
FIGS. 8a-8d show schematic views of various further embodiments of an electromagnetic actuator according to the disclosure.

The magnets 18a, 18b are fixedly connected to an accommodation body 32, in particular embedded in the same. The coils of the first object 12 are fixedly connected to a second accommodation body 36, in particular also embedded in the same. The accommodation body 32 is movable relative to the second accommodation body 36.

In particular for fastening the actuator, preferably the second object 16, to the environment, the illustrated embodiment comprises a connecting device 30. Here, the connecting device 30 is constituted by four connecting holes 34. A connection to the environment can be realized by means of screws via the connecting holes 34, for example.

Figure 8B:
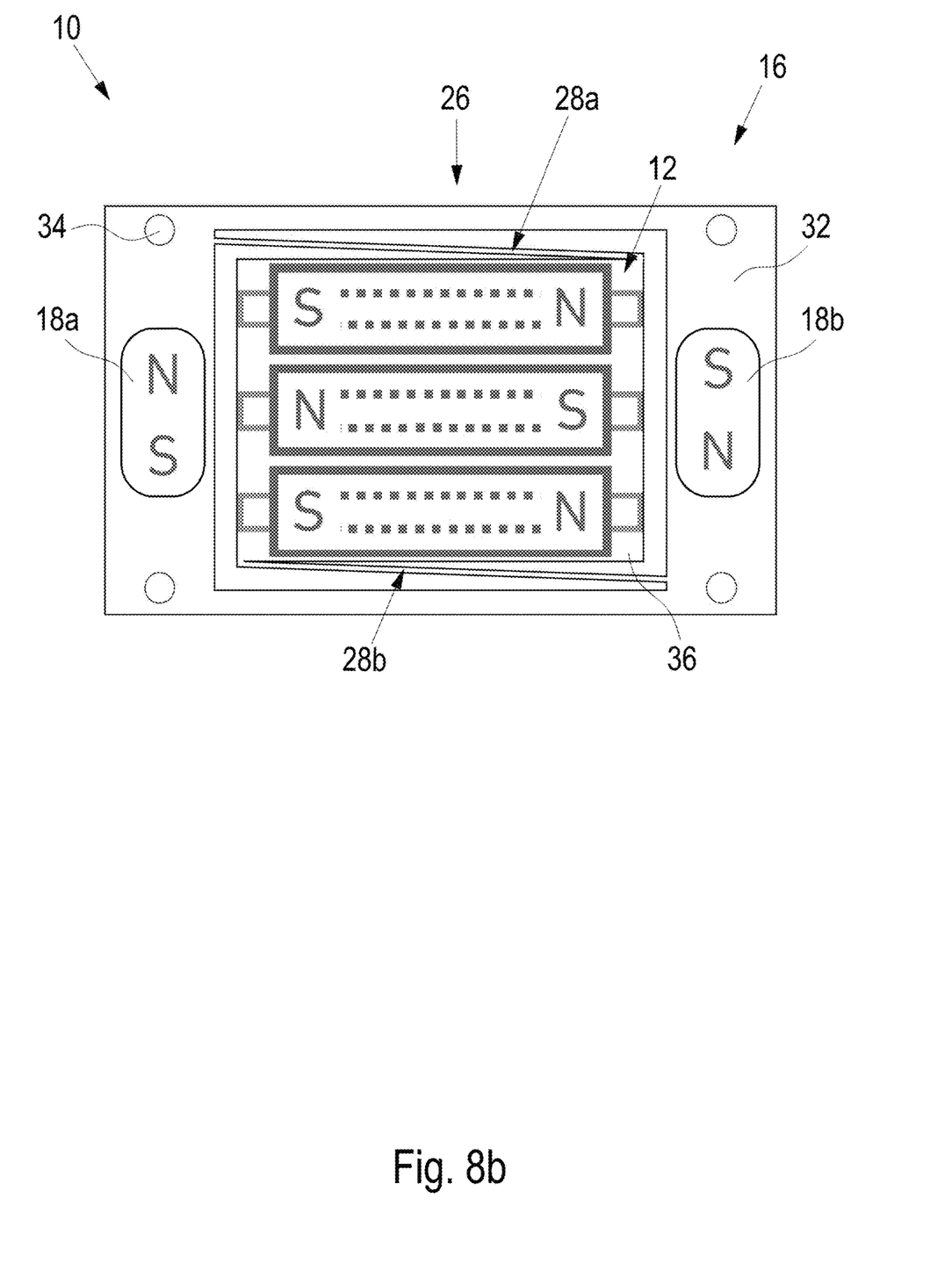

In FIG. 8b, the accommodation body 32 is connected to the second accommodation body 36 via arms 28a, 28b. Preferably, this is an integral connection. It is particularly preferred that the arms 28a, 28b are flexible. When the first object 12 moves relative to the second object 16, in particular moves linearly, the arms 28a, 28b dampen the relative movement. Hence, the arms 28a, 28b form part of a damping device 26.

Figure 8C:
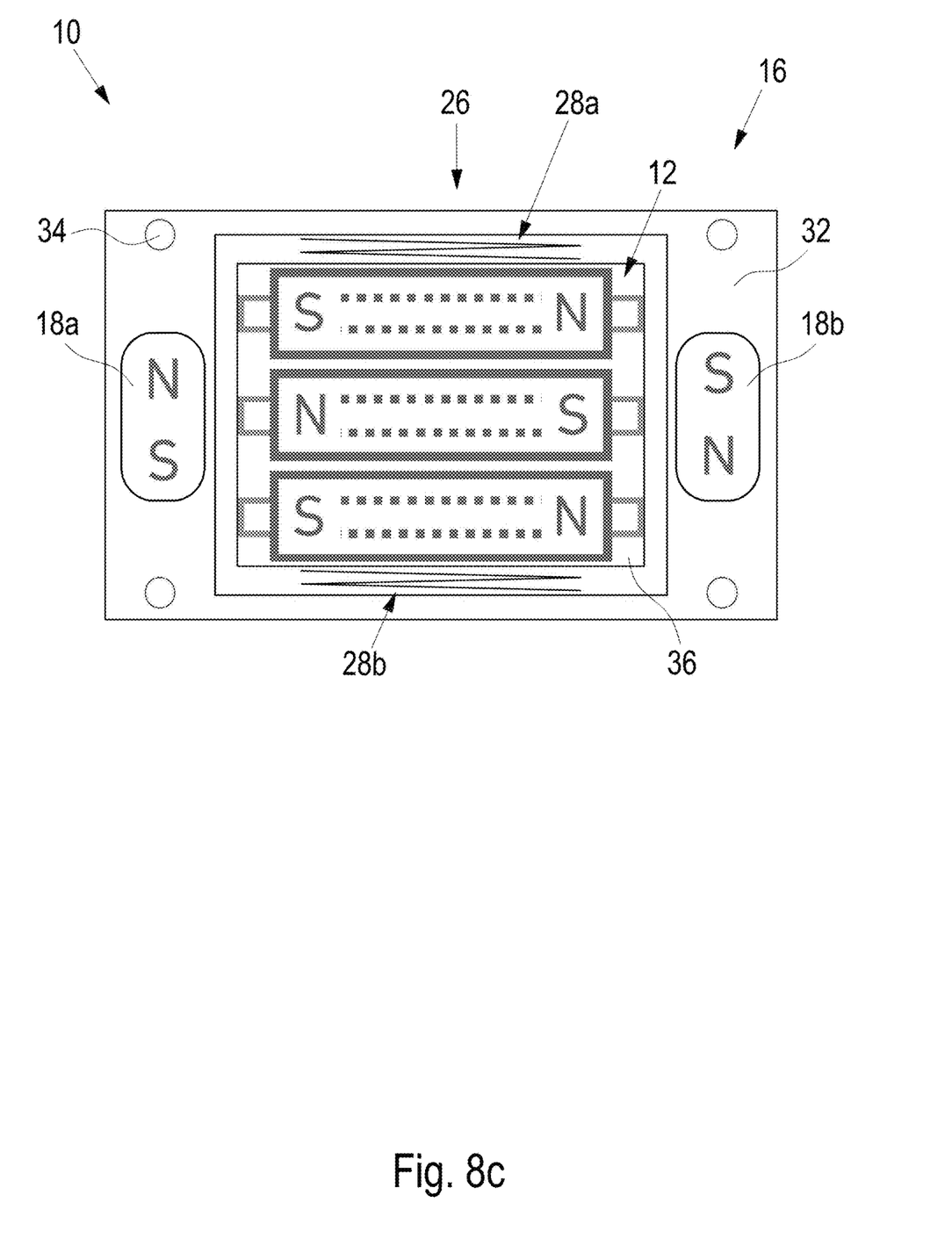

FIG. 8c shows an alternative damping device 26. Here, two spring elements 28a, 28b are arranged between the accommodation body 32 and the accommodation body 36, which also dampen a relative movement.

Figure 8D:
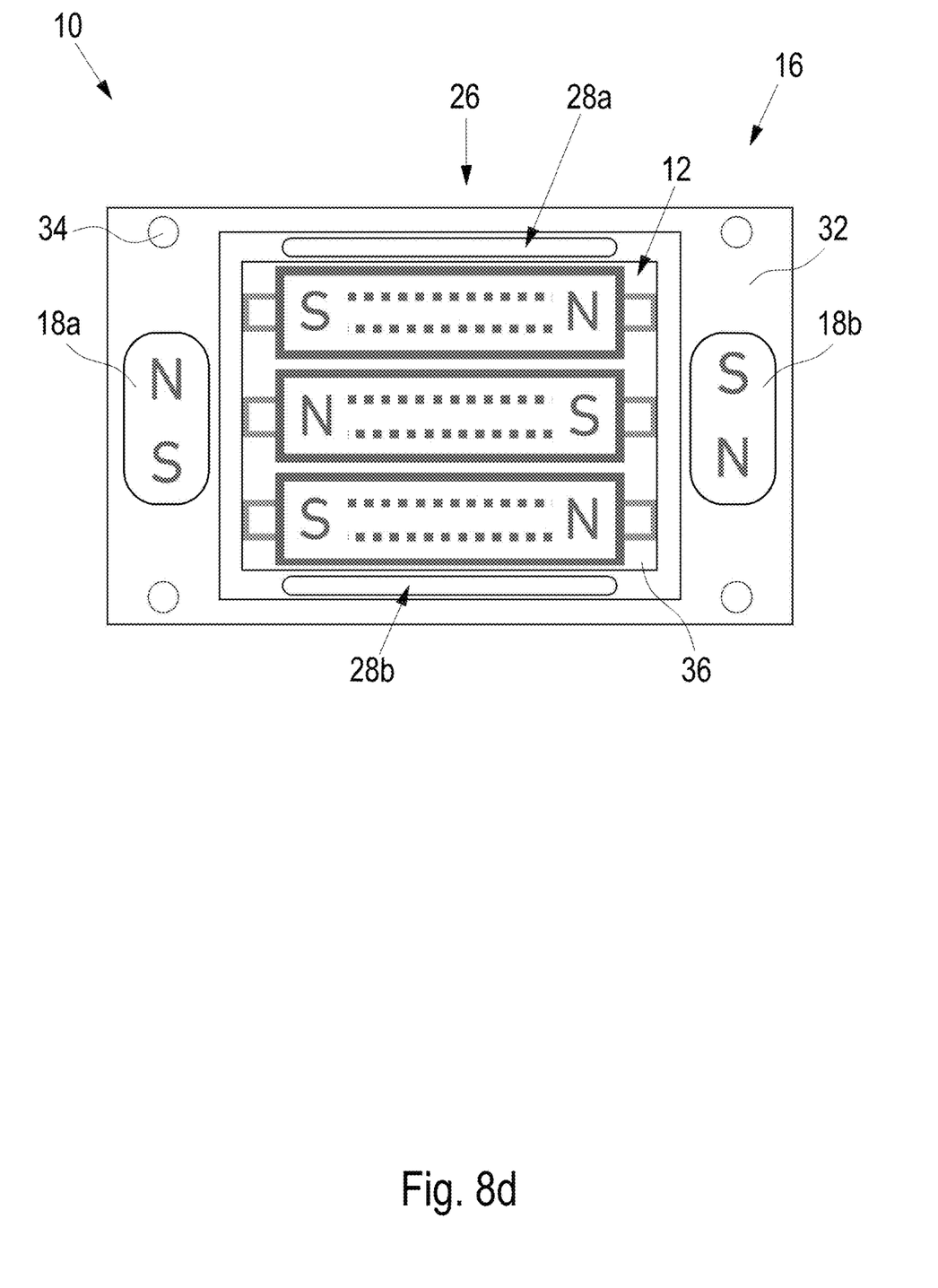

In FIG. 8d the damping device is composed of two preferably elastic damping elements 28a, 28b.

The invention claimed is:

1. An electromagnetic actuator, in particular a vibration actuator, comprising:
   a first object comprising at least one first magnet; and
   a second object comprising at least one second magnet,
   wherein the first object and the second object are movable relative to each other,
   wherein the first object is an oscillator and the second object is a stator, or the first object is a stator and the second object is an oscillator,
   wherein the first object is essentially arranged inside the second object,
   wherein on at least one actuator side, the at least one first magnet of the first object and the at least one second magnet of the second object are arranged opposite each other and act upon each other,
   wherein on the at least one actuator side an uneven number of poles of one object of the first and second object are arranged opposite an even number of poles of the other object of the first and second object and act upon each other, and
   wherein a magnetization direction of the at least one first magnet of the first object is perpendicular to a magnetization direction of the at least one second magnet of the second object.

2. The electromagnetic actuator according to claim 1, comprising a continuous reversal of the polarity of the at least one first magnet of the first object or a continuous reversal of the polarity of the at least one second magnet of the second object for causing the first object and the second object to move relative to each other.

3. The electromagnetic actuator according to claim 1, wherein the at least one first magnet of the first object, and/or the at least one second magnet of the second object, are structurally and/or magnetically symmetrical with respect to one, two, or three symmetry planes.

4. The electromagnetic actuator according to claim 1, wherein the at least one first magnet of the first object comprises coils, wherein the at least one second magnet of the second object comprises a permanent magnet, and wherein the coils of the at least one first magnet of the first object and the permanent magnet of the at least one second magnet of the second object are made of the same material.

5. The electromagnetic actuator according to claim 1, wherein the first object comprises a plurality of magnets, wherein the plurality of magnets of the first object are arranged in parallel or equidistant to each other, and wherein adjacent magnets of the plurality of magnets of the first object have opposite magnetization directions.

6. The electromagnetic actuator according to claim 5, wherein a magnet length of the at least one second magnet of the second object corresponds to a core distance of the plurality of magnets of the first object relative to each other.

7. The electromagnetic actuator according to claim 1, wherein the second object comprises two oppositely arranged magnets, and wherein the two oppositely arranged magnets of the second object are arranged on both sides of the first object.

8. The electromagnetic actuator according to claim 7, wherein the two oppositely arranged magnets of the second object have an identical or an opposite magnetization direction.

9. The electromagnetic actuator according to claim 1, wherein the electromagnetic actuator is configured such that the first object moves perpendicularly to a magnetization direction(s) of the first object or the first object rotates about its own axis, and wherein, in the area of the at least one actuator side, the first object experiences an essentially parallel deflection relative to the magnetization direction(s) of the first object and/or the second object.

10. The electromagnetic actuator according to claim 1, comprising a rotational support and/or a linear support of the first object relative to the second object.

11. The electromagnetic actuator according to claim 1, wherein the first object comprises a first accommodation body and/or the second object comprises a second accommodation body, wherein the first accommodation body fixes the at least one first magnet of the first object, and wherein the second accommodation body fixes the at least one second magnet of the second object.

12. The electromagnetic actuator according to claim 11, comprising a damping device for damping the movement of the first object relative to the second object, wherein the damping device comprises at least one damper on both sides between the first object and the second object.

13. The electromagnetic actuator according to claim 12, wherein the damping device is integrally formed with the first accommodation body of the first object and the second accommodation body of the second object.

14. The electromagnetic actuator according to claim 12, wherein the damping device is integrally formed with the first accommodation body of the first object or the second accommodation body of the second object.

15. The electromagnetic actuator according to claim 1, wherein the first object comprises three first magnets and the second object comprises two second magnets, or wherein the first object comprises one first magnet and the second object comprises two second magnets, or wherein the first object comprises five first magnets and the second object comprises four second magnets.

16. The electromagnetic actuator according to claim 1, wherein two oppositely arranged different magnetic poles of the second object are associated with at least one magnetic pole of the first object, and wherein the oppositely arranged different magnetic poles of the second object act upon the at least one magnetic pole of the first object.

17. The electromagnetic actuator according to claim 16, wherein each magnetic pole of an object is arranged essentially centrally with respect to the two oppositely arranged different magnetic poles of another object.

18. The electromagnetic actuator according to claim 1, wherein the first object comprises a plurality of magnets, wherein the plurality of magnets of the first object are arranged in parallel or equidistant to each other, or wherein adjacent magnets of the plurality of magnets of the first object have opposite magnetization directions.

19. The electromagnetic actuator according to claim 1, wherein two oppositely arranged different magnetic poles of the first object are associated with at least one magnetic pole of the second object, and wherein the oppositely arranged different magnetic poles of the first object act upon the at least one magnetic pole of the second object.

* * * * *